US006896592B2

United States Patent
Smith

(10) Patent No.: US 6,896,592 B2
(45) Date of Patent: May 24, 2005

(54) METHOD OF BURNISHING A BURNISHABLE REAR PAD SLIDER IN A DISK DRIVE

(75) Inventor: Gordon James Smith, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 137 days.

(21) Appl. No.: 10/621,812

(22) Filed: Jul. 17, 2003

(65) Prior Publication Data

US 2004/0029488 A1 Feb. 12, 2004

Related U.S. Application Data

(63) Continuation of application No. 09/886,566, filed on Jun. 21, 2001.

(51) Int. Cl.[7] ............................................... B34B 1/60
(52) U.S. Cl. ........................... 451/41; 360/103; 73/105; 29/90.01
(58) Field of Search ........................... 451/41, 278, 280, 451/272; 360/103; 73/105; 29/90.01

(56) References Cited

U.S. PATENT DOCUMENTS

| 5,473,485 A | * | 12/1995 | Leung et al. ............ 360/237.1 |
| 5,488,524 A | | 1/1996 | Cunningham |
| 5,612,839 A | | 3/1997 | Jacques |
| 5,659,447 A | * | 8/1997 | Gregory et al. ............ 360/237 |
| 5,734,519 A | | 3/1998 | Fontana, Jr. et al. |
| 5,825,587 A | | 10/1998 | Bolasna et al. |
| 5,872,686 A | | 2/1999 | Dorius et al. |
| 5,880,900 A | | 3/1999 | Okada et al. |
| 6,040,959 A | | 3/2000 | Kobayashi et al. |
| 6,227,042 B1 | * | 5/2001 | Ruiz ............................ 73/105 |
| 6,493,184 B1 | * | 12/2002 | Smith ......................... 360/135 |
| 6,497,021 B2 | * | 12/2002 | Lee et al. .................. 29/90.01 |

FOREIGN PATENT DOCUMENTS

| JP | 002 4076 A | 2/1986 |
| JP | 05205220 A | 8/1993 |
| JP | 06176321 A | 6/1994 |
| JP | 06325529 A | 11/1994 |
| JP | 07122019 A | 5/1995 |

OTHER PUBLICATIONS

IBM, "Pre–Conditioning of Sliders to Minimize Disk Damage During Load/Unload," IBM Technical Disclosure Bulletin, vol. 39, No. 10, Oct. 1996.

* cited by examiner

*Primary Examiner*—Eileen P. Morgan
(74) *Attorney, Agent, or Firm*—Timothy A. Czaja

(57) ABSTRACT

A method of burnishing a rear pad of a slider within a disk drive. The rear pad is formed of a burnishable material and maintains elements for reading and writing. The disk drive further includes a spindle motor rotatably driving a disk and an actuator assembly positioning the slider over a surface of the disk. With this in mind, the method includes rotating the disk. The slider is moved in a radial fashion relative to the disk surface in a reciprocal fashion, causing the rear pad to rock. As the rear pad rocks, contact between the rear pad and the disk surface burnishes the rear pad. As a result, a positive camber is imparted in the rear pad relative to the MR element. The above-described method can be practiced following initial manufacture of the disk drive, or at various times over the life of the disk drive. Regardless, the method is practiced in-situ and is therefore very fast, cheap, and adapts quickly to the particular disk in which the slider is flying.

14 Claims, 3 Drawing Sheets

METHOD OF BURNISHING A BURNISHABLE REAR PAD SLIDER IN A DISK DRIVE

This application is a continuation of Ser. No. 09/886,566 filed Jun. 21, 2001.

FIELD OF THE INVENTION

The present invention relates to air bearing sliders for use with disk drives. More particularly, it relates to a method of forming or burnishing a burnishable rear pad slider within a disk drive.

BACKGROUND OF THE INVENTION

A magnetic disk drive apparatus is an apparatus for recording and reading data on the surfaces of spinning disks through the use of a changing magnetic field. One or more data storage disks are coaxially mounted on a hub of a spindle motor. The spindle motor rotates the disks at speeds typically on the order of several thousand to tens of thousands of revolutions-per-minute. Digital information, representing various types of data, is typically written to and read from the data storage disks by one or more transducers, or read/write heads, which are mounted to an actuator assembly and hover above the surface of the rapidly rotating disks.

The transducer head is typically in the form of a magnetoresistive (MR) head or element carried on a slider body. Oftentimes, the slider and transducer are designated as a "head". Regardless, the slider body is mounted to a flexible suspension portion of an arm assembly that is otherwise part of the actuator assembly. Upon final assembly, the actuator assembly positions the slider over a surface of a disk. The slider is configured such that as the disk rotates, an air bearing develops between the slider and the disk surface, causing the slider, and thus the read and write elements, to lift and fly several micro inches above the disk surface. The distance between the slider and the disk surface is often times referred to as a "fly height". In magnetic recording technology, it is desired to "fly" the slider as closely as possible to the disk surface (i.e., minimal fly height) so that the read transducer can distinguish between the magnetic fields emanating from closely spaced regions on the disk.

Disk drive manufacturers constantly strive to improve upon the slider design to provide a minimized fly height, along with the satisfying other constraints as slider roll, pitch, and skew. These features are typically accomplished by forming (e.g., etching) aerodynamic rails or pads into the slider body. These rails must be machined to exacting standards, and constitute permanent structures. That is to say, the rails or pads will not erode or otherwise change shape upon expected or unexpected contact with the disk surface. In contrast, a recently developed slider configuration incorporates a burnishable rear pad. Unlike traditional slider rail or pad constructions, a burnishable rear pad slider design relies upon reshaping of the rear pad upon contact with the rotating disk to achieve a final shape and fly height.

As a point of reference, the rear pad of a burnishable rear pad slider maintains the read and/or write elements. During manufacture, the rear pad is formed to have generally linear or planar side and bottom surfaces, and may have an enlarged height or thickness. More particularly, in conjunction with other disk drive parameters, including configuration of the actuator arms and other slider components, such as a slider body support structure, the rear pad is normally formed to a thickness slightly greater than the expected final thickness that would otherwise produce a desired a fly height. In other words, upon final assembly of the disk drive and initial rotation of the disk at normal operation speeds, the rear pad continues to contact or rub against the relevant disk surface. Because the rear pad is made of a burnishable material, continued contact between the rear pad and the rotating disk burnishes the rear pad, thereby reducing its height. In theory, this burnishing procedure continues until the rear pad thickness has been reduced to a point where rear pad just begins to fly relative to the disk surface. This results in fly height that theoretically is as small as possible.

The above-described burnishable rear pad slider design appears highly viable. The exacting manufacturing tolerances required of conventional slider pad or rail designs is eliminated, and a highly minimized fly height can be achieved. However, opportunities for improvement exist. The current technique for burnishing the rear pad produces a rear pad height profile that is essentially co-planar with the disk surface. For disk drive applications, this shape is less than aerodynamically optimal.

Burnishable rear pad slider technology represents a distinct advancement in the disk drive art. Certain opportunities exist for perfecting implementation of this technology, including an optimal burnishment methodology. Therefore, a need exists for a method of optimally burnishing or shaping a burnishing rear pad slider.

SUMMARY OF THE INVENTION

One aspect of the present invention relates to a method of burnishing a rear pad of a slider within a disk drive. The rear pad is formed of a burnishable material and maintains a read and/or write element. The disk drive further includes a spindle motor rotatably driving a disk, and an actuator assembly positioning the slider over a surface of the disk. With this in mind, the method includes rotating the disk. The slider is moved in a radial fashion relative to the disk surface in a reciprocal fashion, causing the rear pad to rock. As the rear pad rocks, contact between the rear pad and the disk surface burnishes the rear pad. As a result, a positive camber is imparted in the rear pad relative to the read and/or write element. The above-described method can be practiced following initial manufacture of the disk drive, or at various times over the life of the disk drive. Regardless, the method is practiced in-situ and is therefore very fast, inexpensive, and adapts quickly to the particular disk surface over which the slider is flying.

Another aspect of the present invention relates to a method of shaping a rear pad of a slider within a disk drive. The rear pad is formed of a burnishable material and maintains a read and/or write element. The disk drive further includes a spindle motor rotatably driving a disk and an actuator assembly positioning the slider over a surface of the disk. Further, during normal operation of the disk drive, rotation of the disk at a normal operational speed generates an air bearing between the slider and the disk surface, the air bearing dictating a fly height. With this in mind, the method includes initially forming the rear pad to an increased height such that at the normal operational speed, the rear pad is loaded against the disk surface and the fly height is zero. The disk is rotated such that the rear pad rubs against the disk surface. Finally, the slider is maneuvered radially relative to the disk surface in a reciprocal fashion as part of a first burnishing mode of operation, causing the rear pad to rock. During a first burnishing mode of operation, the above-described contact between the rear pad and the disk surface causes the height of the rear pad to decrease and imparts a positive camber into the rear pad. In one preferred embodiment, the method further includes establishing a radial acceleration of the slider in the first burnishing mode of operation as greater than a radial acceleration of the slider under normal operational conditions of the disk drive. In another preferred embodiment, the disk rotational speed is varied to further enhance burnishment.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
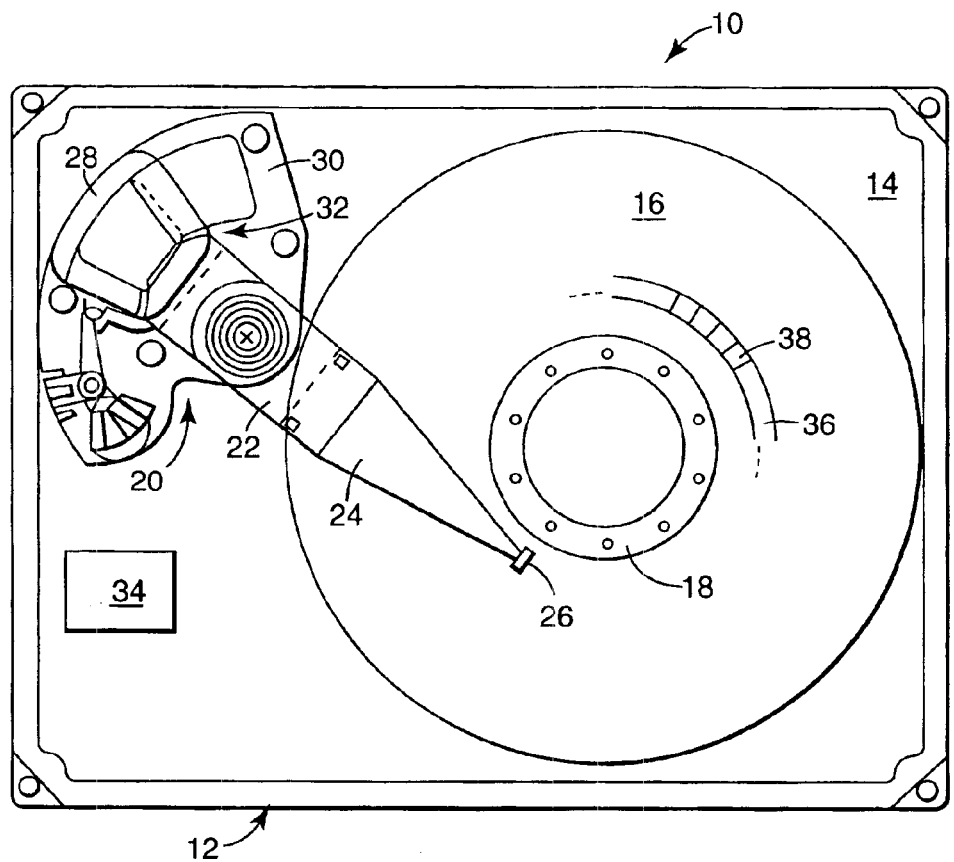
FIG. 1 is top view of an exemplary disk drive in accordance with the present invention with its upper housing cover removed and portions shown in block form.

An exemplary disk drive system 10 is provided in FIG. 1. As a point of reference, the disk drive 10 includes a housing 12 defined by a cover (not shown) and a base 14. For ease of illustration, the cover has been removed from the view of FIG. 1. As a further point of reference, the disk drive 10 is shown by way of example and not of limitation. Many different types of disk drive data storage devices or systems can benefit from the present invention.

With the above in mind, the disk drive 10 typically includes one or more magnetic data storage disks 16 that rotate about a spindle motor 18. An actuator assembly 20 typically includes a plurality of interleaved actuator arms 22, with each arm 22 having one or more suspensions 24 each maintaining a head or slider 26. The slider 26 is described in greater detail below, but generally includes a read head, such as an MR read element, and a write head, such as an inductive write element. Regardless, the actuator assembly 20 further includes a coil assembly 28 which cooperates with a permanent magnet structure 30 to operate as an actuator voice coil motor (VCM) 32 responsive to control signals produced by a controller 34. The controller 34 preferably includes control circuitry that coordinates the transfer of data to and from the data storage disks 16, and cooperates with the VCM 32 to move the actuator arms 22, suspensions 24, and sliders 26 to prescribed track 36 and sector 38 locations when reading and writing data to and from the disks 16.

Figure 2:
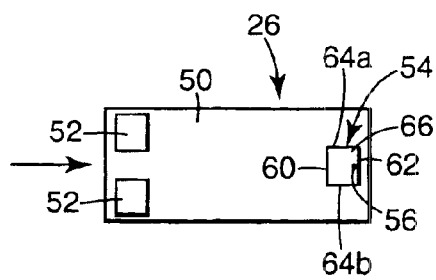
FIG. 2 is a diagrammatic, bottom view of a slider portion of the disk drive of FIG. 1.

The slider 26 is a burnishable rear pad slider and is shown in greater detail by the diagrammatic bottom view of FIG. 2. In general terms, the slider 26 includes a support body 50, front pads 52, a rear pad 54, and read and write elements 56 (exaggerated in FIG. 2 for purposes of illustration). As a point of reference, rotation of the disk 16 (FIG. 1) relative to the slider 26 upon final assembly is represented by an arrow in FIG. 2.

The configuration and location of the front pads 52 in FIG. 2 is but one example of an acceptable design. That is to say, the front pads 52 can assume a wide variety of forms other than that specifically shown, and can instead constitute elongated rails, etc. Regardless, the front pads 52 are provided to generate an air bearing as the disk 16 (FIG. 1) rotates beneath the slider 26. In this regard, the slider 26 configuration of FIG. 2 results in negative pressure air bearing. Alternatively, the slider 26 can be configured to provide a positive pressure air bearing. In either case, the force created by the air bearing is balanced by the downward force of the suspension 24 (FIG. 1).

The rear pad 54 is formed of a burnishable material, such as alumina. The rear pad 54 extends downwardly relative to the support body 50 (or out of the page of FIG. 2) and defines a leading surface 60, a trailing surface 62, opposing side surfaces 64a, 64b, and a bottom surface 66. With additional reference to FIG. 3A, which diagrammatically depicts a front view of the slider 26 relative to a disk 16, the rear pad 54 is initially manufactured such that each of the surfaces 60–66 are relatively flat, forming a generally cube-like structure. That is to say, each of the leading surface 60, trailing surface 62, and opposing side surfaces 64a, 64b, extend in a perpendicular fashion from the planar lower surface 68 of the support body 50. Further, the bottom surface 66 of the rear pad 54 is perpendicular to the planes defined by each of the leading surface 60, trailing surface 62, and opposing side surfaces 64a, 64b. In this regard, while the bottom surface 66 is illustrated as being flat, because it will subsequently be burnished, the bottom surface 66 can instead initially be relatively rough, as can the other surfaces 60, 62, 64a, 64b.

Figure 3A:
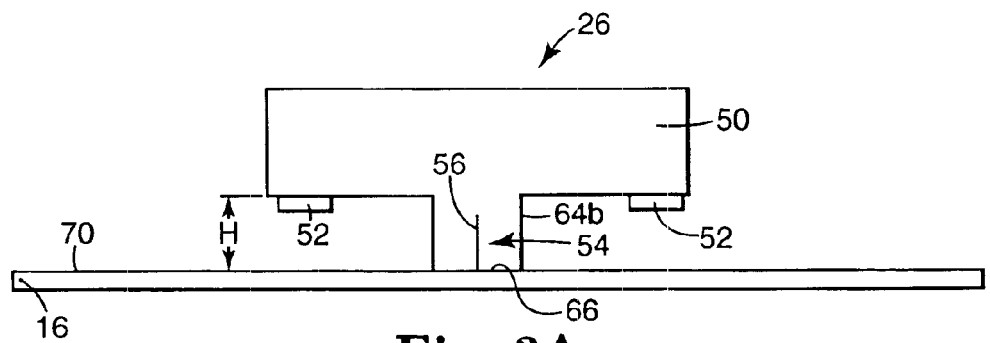
FIGS. 3A–3C illustrate burnishing of a rear pad portion of the slider of FIG. 2 in accordance with the present invention.

An initial height (H) in FIG. 3A of the rear pad 54 is selected to be greater than the anticipated height that would otherwise result in a spacing (or fly height) between the bottom surface 66 and an outer surface 70 of the disk 16. That is to say, in combination with known positioning parameters provided by the relevant actuator arm 22 (FIG. 1), an estimate can be made as to a final height of the rear pad 54 when the slider 26 will fly relative to the disk surface 70 at normal operational speeds. An example of this relationship is provided in FIG. 3B, with the final rear pad 54 height being identified as H' and a spacing (or fly height) between the bottom surface 68 and the disk surface 70 being exaggerated for purposes of illustration. It should be further noted that the differences in rear pad 54 height between FIGS. 3A and 3B has also been greatly exaggerated; in actual practice, the initial height H need only be slightly greater than the anticipated final height H', corresponding to a fly height of approximately 5 nanometers. Regardless, the initial rear pad 54 height is selected such that the bottom surface 56 continues to contact or rub against the disk surface 70 at normal operational speeds.

Figure 3B:
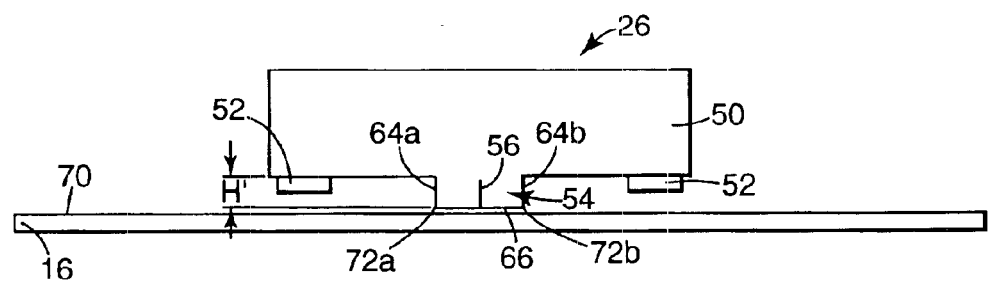

Following assembly, the disk drive 10 (FIG. 1) is then operated in a burnishing mode so as to reduce the rear pad 54 height. With prior art slider-wearing techniques, the disk 16 would simply be rotated while the slider 26 remained stationary. With this approach, the rear pad 54 would be burnished as shown in FIG. 3B. The opposing side surfaces 64a, 64b remain planar or linear, perpendicular to the bottom surface 66. This configuration results in distinct, 90° corners 72a, 72b at the intersections of the opposing side surfaces 64a, 64b with the bottom surface 66. These corners 72a, 72b are highly undesirable as they can subsequently engage or contact the disk surface 70 during subsequent, normal use. Further, the surface area or "foot" provided by the bottom surface 66 remains relatively large and flat. From an aerodynamic standpoint, this configuration is less than optimal, and likely results in a greater fly height than would otherwise be necessary.

Figure 3C:
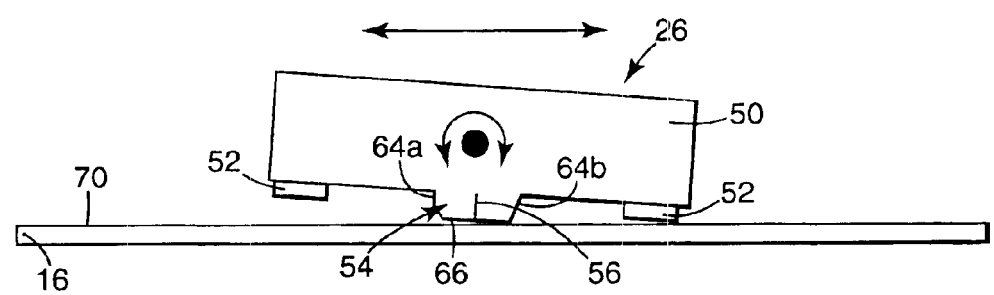

The method of the present invention overcomes the above deficiencies by forcing the slider 26, and in particular the rear pad 54, to rock during the burnishing mode of operation. More particularly, and with reference to FIG. 3C, the slider 26 is moved radially relative to the disk 16 in a reciprocal fashion during the burnishing mode of operation. The velocity and acceleration of this radial movement is appropriately selected such that the slider 26 is rotated laterally during each radial movement, resulting in the desired lateral rocking motion (represented by an arrow in FIG. 3C). In a preferred embodiment, movement of the slider 26 during the burnishing mode of operation is characterized by a radial acceleration in excess of the radial acceleration normally encountered by the disk drive 10 during normal operation. As the slider 26 rocks, the opposing side surfaces 64a, 64b alternately contact the disk surface 70, and are thus burnished. This technique eliminates the "sharp" corners 72a, 72b otherwise found in FIG. 3B. Effectively, then, the opposing side surfaces 64a, 64b are blended relative to the bottom surface 66, imparting a positive camber into the rear pad 54 relative to the read and write elements 56. In a preferred embodiment, the opposing side surfaces 64a, 64b are non-symmetrically blended, to further optimize the aerodynamic performance of the rear pad 54. As is further shown in FIG. 3C, the preferred blending methodology greatly reduces the final surface area presented by the bottom surface 66, thereby even further minimizing the resulting fly height. Positive camber ensures that the minimal spacing along the bottom surface 66 of the rear pad 54 is at the location of the read and write elements 56.

In a preferred embodiment, the slider 26 is moved tangentially relative to the disk surface 70 in addition to the above-described, reciprocal radial movement. This tangential movement causes a front-to-back rocking motion of the rear pad 54, further burnishing or blending the trailing surface 62 relative to the bottom surface 66. Even more preferably, the burnishing mode of operation is characterized by a specific relationship between radial and tangential velocity and acceleration of the rear pad 54 with respect to the disk 16.

The above-described rocking motion can be effectuated at various points during the burnishing mode of operation. For example, in one preferred embodiment, the slider 26, and thus the rear pad 54 is initially maintained in a stationary radial position (while the disk 16 continues to rotate), such that the bottom surface 66 is relatively uniformly burnished, decreasing only in height. Following a predetermined time period, or in conjunction with an analysis of MR element-to-disk spacing, this stationary burnishing proceeds to a point at which the vertical preload on the slider 26 is almost balanced by the air bearing force. At this point, a high acceleration, radial reciprocating motion is placed on the slider 26 (for example, via control of the VCM 32 (FIG. 1)) in order to cause the above-described blending of the opposing side surfaces 64a, 64b. Once again, the rear pad 54 acquires a positive camber as a result of this blending.

Figure 4:
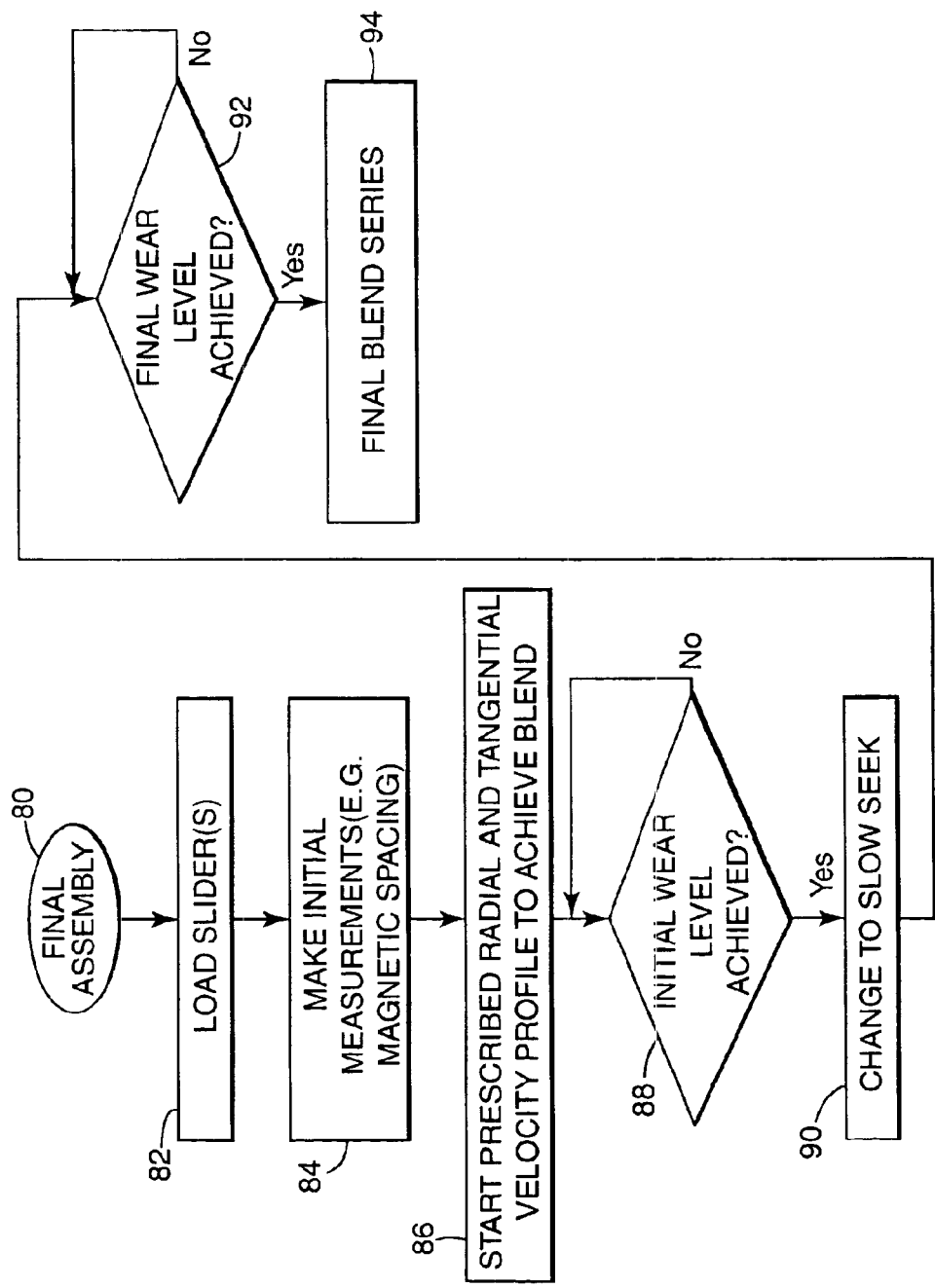
FIG. 4 is a flow diagram illustrating a preferred method of the present invention.

An alternative method in accordance with the present invention is illustrated by the flow diagram of FIG. 4. The burnishing mode of operation begins at step 80 following final assembly of the disk drive 10. The slider 26 is loaded against the disk surface 70 and disk rotation initiation at step 82. In this regard, and as previously described, following initial manufacture, the rear pad 54 as an enlarged height such that the bottom surface 66 contacts or rubs against the disk surface 70 at normal operational disk rates.

At step 84, an initial measurement of spacing between the MR element or write element 56 and the disk surface 70 is made. Any of a number of known measurement techniques can be employed, including magnetic spacing, thermal spacing, MR resistance, slider vibrations, length of time of disk rotation, etc.

With the spacing measurement in hand, the slider 26 is moved in a radial, reciprocating fashion so as to burnish the opposing side surfaces 64a, 64b at step 86. In this regard, it is recognized that a large rocking angle (for a given radial acceleration) will occur when the rear pad 54 has its greatest height (i.e., when burnishing first begins). In other words, the corners 72a, 72b formed by the opposing side surfaces 64a, 64b and the bottom surface 66 readily contact the disk surface 70, causing the slider 26, and in particular the rear pad 54, to rock relative to the particular corner 72a, 72b as the slider 26 is accelerated radially. As a result of this elevated rocking angle, a large portion of the otherwise roughened opposing side surfaces 64a, 64b are blended. Further, the rocking motion reduces the surface area or footprint of the bottom surface 66, thereby facilitating more rapid, subsequent burnishing. In a preferred embodiment, the exact control of the initial blending is generated by changing the radial velocity profile between high radial velocities and short radial movement distances, and slow radial velocities and longer radial movements. During this initial blending step, the bottom surface 66 is also burnished, such that the overall height of the rear pad 54 will decrease.

At step 88, a spacing between the MR element 56 and the disk surface 70 (or secondary wear level) is again measured and evaluated relative to the initial spacing measurement to determine whether a predetermined wear level has been achieved. For example, in one preferred embodiment, an absolute height change value will be predetermined and programmed into the disk drive operating system. The change in initial spacing and secondary wear level values is compared against this predetermined value. Alternatively, based upon the initial spacing measurement, a predetermined wear value can be calculated based upon a programmed analysis. The secondary wear level value is compared against the predetermined wear value. Regardless, if it is determined that the change in height or spacing is less than a predetermined value ("no" at step 88), the above-described radial blending initiated at step 86 continues. Once the initial wear level has been achieved ("yes" at step 88), the burnishing mode of operation continues to step 90 where the slider 26 is transitioned through relatively slow radial movements. As a result, burnishing of the rear pad 54 continues, but without lateral rocking of the rear pad 54. Due to the above-described blending, because the surface area or footprint provided by the bottom surface 66 has been greatly reduced prior to step 90, the burnishing at step 90 occurs more rapidly than would otherwise be observed without blending.

At step 92, the spacing between the MR element 56 and the disk surface 70 is again evaluated and compared against a final wear level value. The final wear level can be a function of the initial spacing determined at step 84 and/or the secondary wear level value determined at step 88. Alternatively, the final wear level can simply be a reflection of the MR element 56 achieving a nominal fly height. Until the final wear level is achieved ("no" at step 92), the burnishing (with slow radial movement of the slider 26) continues.

Once the final wear level has been obtained ("yes" at step 92), the burnishing mode of operation transitions the slider 26 through a final blend series at step 94. The final blend series is characterized by a series of reciprocal radial movements of the slider 26 sufficient to cause the slider 26, and thus the rear pad 54, to laterally rock. This rocking motion again causes the opposing side surfaces 64a, 64b to be further burnished, thereby optimizing the final shape of the rear pad 54 along the bottom surface 66. Once again, this final shape is characterized by the rear pad 54 having a positive camber relative to the MR element 56, along with the absence of distinct corners and a decreased surface area or footprint at the bottom surface 66.

Although not illustrated in the above example, it is recognized that the disk rate and/or relative tangential speed of the slider 26 may also be altered to effectuate a front-to-back blend of the rear pad 54.

In addition to effectuating initial burnishment of the rear pad 54, the method of the present invention is equally applicable to readjusting the shape of the rear pad 54 during subsequent use of the disk drive 10. For example, over time, it may be determined that the fly height requires readjustment (i.e., in file fly height adjustments over the life of the disk drive 10). In this regard, the fly height can be temporarily reduced, for example, by reducing the disk speed, and then radially accelerating the slider 26 in a reciprocating fashion as previously described. Once again, this reciprocal, radial movement causes the slider 26, and thus the rear pad 54, to laterally rock. The opposing side surfaces 64a, 64b are then burnished adjacent the bottom surface 66, thereby further reducing the surface area or footprint of the bottom surface 66. As a result of this blending, the air bearing force provided by the rear pad 54 is reduced such that when the disk drive 10 is returned to a normal operational speed, the rear pad 54 will fly closer to the disk 16. As a further benefit, rocking of the rear pad 54 can also serve to clean off debris which may have accumulated along the sides of the rear pad 54. This debris is likely to adversely affect fly height and therefore its removal is tantamount to both mechanical and magnetic performance.

The present invention provides a marked improvement over previous methodologies. In particular, the present invention provides an enhanced burnish procedure for burnishable rear pad sliders. By forcing the rear pad to rock during the burnishing operation, a positive camber is imparted thereto. As a result, aerodynamic performance of the rear pad is optimized. Further, fly height adjustments can be accomplished throughout the life of the disk drive.

Although the present invention has been described with reference to the preferred embodiments, workers skilled in the art will recognize that changes can be made in form and detail without departing from the spirit and scope of the present invention.

What is claimed is:

1. A method of burnishing a rear pad of a slider within a disk drive, the rear pad being formed of a burnishable material and maintaining an element for reading and/or writing, the disk drive further including a spindle motor rotatably driving a disk and an actuator assembly positioning the slider over a surface of the disk, the method comprising:

rotating the disk;

radially moving the slider relative to the disk surface in a reciprocal fashion, causing the rear pad to rock; and burnishing the rear pad via contact between the rear pad and the disk surface;

wherein the rear pad is burnished as the rear pad rocks, imparting a positive camber in the rear pad relative to the reading and/or writing element.

2. The method of claim 1, wherein the rear pad defines a height, and further wherein burnishing the rear pad includes reducing the height.

3. The method of claim 1, wherein the rear pad defines a leading surface, a trailing surface, opposing side surfaces, and a bottom surface opposite a support body of the slider, and further wherein radially moving the rear pad includes alternately contacting the opposing side surfaces against the disk surface.

4. The method of claim 3, wherein imparting a positive camber includes forming at least a portion of each of the opposing side surfaces to be non-perpendicular relative to the bottom surface.

5. The method of claim 4, wherein imparting a positive camber includes blending each of the opposing side surfaces relative to the bottom surface.

6. The method of claim 4, wherein a width of the rear pad is defined by a distance between the opposing sides, and further wherein imparting a positive camber includes establishing a minimum width of the rear pad at the bottom surface.

7. The method of claim 3, wherein following burnishing the opposing side surfaces are non-symmetrical.

8. The method of claim 1, wherein radially moving the slider relative to the disk surface includes radially accelerating the slider relative to the disk surface.

9. The method of claim 1, further comprising:

moving the slider tangentially relative to the disk surface, causing the rear pad to rock longitudinally.

10. The method of claim 9, further comprising:

correlating radial slider movement and tangential slider movement to optimize a shape of the rear pad following burnishing.

11. The method of claim 1, wherein radially moving the slider includes operating the actuator assembly in a first operational state when a height of the rear pad is relatively large and in a second operational state when the height is reduced, and further wherein the first operational state differs from the second operational state by at least one of radially slider velocity, radial slider acceleration, radial slider travel distance, and tangential slider velocity.

12. The method of claim 11, wherein the first operational state is characterized by an initial stage of burnishing and the second operational state is characterized by a final stage of burnishing, and further wherein the slider is moved a shorter radial distance in the second operational state as compared to the first operational state.

13. The method of claim 12, further comprising:

establishing parameters of the first operational state and the second operational state prior to radially moving the slider.

14. The method of claim 1, wherein the rear pad is burnished in-file.

* * * * *